(12) United States Patent
Demopoulos (10) Patent No.: US 8,290,618 B2
(45) Date of Patent: Oct. 16, 2012

(54) DETERMINING POSITIONS

(75) Inventor: Andreas Haralambos Demopoulos, Bedfordshire (GB)

(73) Assignee: CNOS Automations Software GmbH (DE)

( * ) Notice: Subject to any disclaimer, the term of this patent is extended or adjusted under 35 U.S.C. 154(b) by 511 days.

(21) Appl. No.: 12/528,742

(22) PCT Filed: Mar. 3, 2008

(86) PCT No.: PCT/GB2008/050146
§ 371 (c)(1),
(2), (4) Date: Aug. 26, 2009

(87) PCT Pub. No.: WO2008/107715
PCT Pub. Date: Sep. 12, 2008

(65) Prior Publication Data
US 2010/0103431 A1   Apr. 29, 2010

(30) Foreign Application Priority Data

Mar. 5, 2007 (GB) .................................. 0704156.9
Dec. 24, 2007 (GB) .................................. 0725139.0

(51) Int. Cl.
G01B 11/14 (2006.01)
(52) U.S. Cl. ........ 700/245; 700/248; 356/620; 356/622; 356/614; 901/47
(58) Field of Classification Search .................. 700/248, 700/245; 356/620, 622, 614; 901/47
See application file for complete search history.

(56) References Cited

U.S. PATENT DOCUMENTS

| 4,714,339 A | 12/1987 | Lau et al. | |
|---|---|---|---|
| 4,753,569 A | 6/1988 | Pryor | |
| 4,876,656 A * | 10/1989 | Leicht et al. | 716/103 |
| 5,059,789 A * | 10/1991 | Salcudean | 250/206.1 |
| 5,608,847 A * | 3/1997 | Pryor | 700/248 |
| 5,805,289 A * | 9/1998 | Corby et al. | 356/613 |

(Continued)

FOREIGN PATENT DOCUMENTS

JP   2001025985   1/2001

(Continued)

OTHER PUBLICATIONS

PCT International Search Report and the Written Opinion for International Application No. PCT/GB2008/050146, dated Dec. 12, 2008.

(Continued)

Primary Examiner — Drew Brown
(74) Attorney, Agent, or Firm — Tumey L.L.P.

(57) ABSTRACT

The position of a movable element such as the end of a robot arm (10) which has several degrees of freedom, being mounted on a base (11) and including a wrist mechanism, is determined by installing a multiplicity of base targets (32, 74) around the base of the robot, and a multiplicity of arm targets (42, 74) around the base (14) of the wrist mechanism (15), and an optical means (90) that moves with the movable element to determine the positions of at least some of the base targets and of at least some of the arm targets. The optical means may be a laser tracker or a camera system (90), and it may be mounted on the part (13) of the robot arm to which the base (14) of the wrist mechanism (15) is connected. This enables existing robots (10) to achieve absolute positional accuracy relative to a fixed external frame of reference.

13 Claims, 6 Drawing Sheets

U.S. PATENT DOCUMENTS

| | | | | |
|---|---|---|---|---|
| 5,956,417 A * | 9/1999 | Pryor | ............................ | 382/154 |
| 6,044,183 A * | 3/2000 | Pryor | ............................ | 382/287 |
| 6,101,455 A * | 8/2000 | Davis | ............................. | 702/94 |
| 6,163,946 A * | 12/2000 | Pryor | ......................... | 29/407.04 |
| 6,167,607 B1 * | 1/2001 | Pryor | ......................... | 29/407.04 |
| 6,301,763 B1 * | 10/2001 | Pryor | ......................... | 29/407.04 |
| 6,314,631 B1 * | 11/2001 | Pryor | ......................... | 29/407.04 |
| 7,800,758 B1 * | 9/2010 | Bridges et al. | ................ | 356/482 |
| 8,049,867 B2 * | 11/2011 | Bridges et al. | ............... | 356/3.01 |
| 2003/0048459 A1 * | 3/2003 | Gooch | .......................... | 356/620 |
| 2003/0090682 A1 * | 5/2003 | Gooch et al. | .................. | 356/620 |

FOREIGN PATENT DOCUMENTS

| | | |
|---|---|---|
| WO | WO 0177613 | 10/2001 |
| WO | WO 2005108020 | 11/2005 |

OTHER PUBLICATIONS

GB Search Report for Application No. GB0704156.9 dated Jun. 27, 2007.

Ying Bai, "Experiment Study of PUMA Robot Calibration Using a Laser Tracking System", IEEE International Workshop on Soft Computing in Industrial Applications, Jun. 23-25, 2003.

\* cited by examiner

DETERMINING POSITIONS

The present invention relates particularly to a robot, in particular a robot having several degrees of freedom, and to a method and apparatus for determining its position, although it is also applicable to movable devices.

Robots are widely used in industry. Typically a robot will have six degrees of freedom, for example it may consist of an upper arm supported at one end on a base so that it can rotate about two orthogonal axes; a lower arm pivoted to the other end of the upper arm and rotatable relative to it, and also rotatable about its own longitudinal axis; and a gimballed wrist mechanism provided with two orthogonal rotational axes. These several rotational axes are given by way of example only, and other robots have other degrees of freedom, for example one arm component may be telescopic. The movements in every degree of freedom are brought about by a respective motor, typically a servo motor. Robots can be programmed to move the end of the arm to a desired position, the position being determined by the movements of each arm element, for example the angular rotation about each rotational axis. These movements may be determined from the number of rotations of the motor, or may be measured by using encoders. A problem with existing robots is that their programmed position and their actual or absolute position within their working environment are different. The programmed position is defined by the angular position of each joint of the robot. For a 6 degree of freedom robot shown in FIG. 1 this corresponds to six values for each programmed position. The robot controller then coordinates all six servo-motors to achieve the commanded position of each joint. Therefore, the robot will always go to its programmed position, but however accurately this is performed the position relative to an external, absolute set of axes may vary.

This variation arises from various factors:
a) the temperature of the environment affects the lengths of the articulating arm elements;
b) temperature gradients arise from the heat dissipation from servo-motors, which depend on the duty cycle of the robot and which tend not only to expand the articulating arm elements but also to distort them, owing to uneven heat distribution along their length;
c) the lack of stiffness of the robot, so that different loads applied at the end of the robot will yield different deflections.

For all the above reasons, the programmed and actual or "absolute" position of the robot arm will be different at different times of the day. For some applications the resulting variations in position are not of concern, but for other applications the absolute position needs to be determined.

A known technique is to use a laser tracker or highly accurate cameras to determine the actual position of the robot relative to a surrounding cell. Both these methods use targets placed on the robot and the cell to determine their absolute position. A problem with these methods is that the end of the robot may not be visible during part of its operating cycle as it may be hidden from the direct view of the laser tracker or cameras. To combat this problem the robot may be "calibrated" or "corrected" for absolute position at the visible part of its cycle and over the non-visible part of its cycle, the positional errors being estimated using complicated mathematical modelling. This estimation introduces inaccuracies due to the assumptions made in the model.

According to the present invention there is provided an apparatus for determining the position of an element that is movable within a frame of reference, wherein a multiplicity of first targets are fixed relative to the movable element, and a multiplicity of base elements are provided at fixed positions relative to the frame of reference, the apparatus comprising a measurement system including means movable with the movable element, the measurement system comprising means for determining the position of the movable means relative to at least some of the base elements, and for determining the position of at least some of the first targets relative to the position of the movable means.

Preferably the measurement system is an optical measurement system. The movable means of the measurement system may be connected to the movable element, or may be separately supported but held within the vicinity of the movable element.

In another aspect of the present invention there is provided an apparatus for determining the position of the end of a robot arm, the robot arm having several degrees of freedom, the robot arm being mounted on a base and including a wrist mechanism, the wrist mechanism including a rotational support element, the apparatus comprising a multiplicity of base elements around the base of the robot, and a multiplicity of arm targets around the rotational support element, and locating means mounted on or adjacent to the robot arm to enable the positions of at least some of the base elements relative to the locating means and the positions of at least some of the arm targets relative to the locating means to be determined.

Thus the positions of the arm targets (which are not fixed) can be measured with respect to the base elements (which are fixed), the locating means for these measurements itself moving with the arm. The locating means is preferably an optical system, although it might instead be for example an ultrasonic system or an infra-red system.

This apparatus enables existing robots to achieve absolute positional accuracy. The apparatus can be fitted to any type of articulating robot. It enables the absolute position of the robot arm to be measured along its entire trajectory and under its actual working conditions, rather than requiring mathematical or other modelling. By attaching an array of arm targets around the rotational axis supporting the wrist mechanism of the robot, the 6-axis robot is effectively broken down into two robots: a 4-axis robot and a 2-axis robot attached at the end of the 4-axis robot (assuming the wrist mechanism provides two axes). The arm targets are attached to the base of this 2-axis robot. This overcomes the major problem of direct vision, as at least the base of this 2-axis robot could always be visible by suitable placement of, for example, a laser tracker or a photogrammetry camera system.

The targets or elements associated with the base or with the movable element (the robot arm) will depend upon the measurement system that is used. For example retro-reflectors would be used in combination with a laser tracker; photogrammetry targets or LEDs would be associated with a camera-based system; or the measurement system may measure distances from the time-of-flight of a signal between an emitter and a reflector, for example an optical pulse.

It should also be appreciated that the term "wrist mechanism" might encompass more complicated mechanisms providing a larger number of degrees of freedom. For example the wrist mechanism might instead be replaced by a highly accurate thermally-compensated light-weight measurement or welding robot, the measurement or welding robot being rigidly connected to the rotational support element. The rotational support element may be referred to as the base of the wrist mechanism or as the A4 rotational element, as it enables the wrist mechanism (or whatever mechanism is connected to it) to rotate about the A4 axis. The apparatus enables the absolute position of the base of the wrist mechanism to be determined with a high accuracy at all times, and under actual working conditions. The position of the end of the robot arm or of a tool can be deduced, because the variations arising from the factors described above are on a markedly smaller scale, and can be calculated, calibrated or measured. The "wrist mechanism" may therefore provide several degrees of freedom; indeed it may for example be a six-axis robot arm.

The optical means may comprise a laser tracker or a photogrammetry camera fixed to the robot arm, or this optical means may be carried by another arm mechanism arranged to ensure it remains adjacent to the robot arm. This arrangement may have blind spots, but if absolute positional accuracy is not required at those blind spots this deficiency is not relevant, or the position of the optical means may be adjusted to avoid such blind spots. In one preferred embodiment the base elements are base targets; in this case the optical means may comprise a laser tracker. The optical means may instead comprise one or more cameras. So in another embodiment the optical means comprises at least one camera to view the arm targets and at least one camera to view the base targets. In another embodiment the base elements comprise base cameras, and in this case the optical means comprises at least one target and at least one camera to view the arm targets. In each embodiment the optical means is preferably mounted on an arm element to which the base of the wrist mechanism is attached, or on another arm mechanism arranged to ensure it remains adjacent to this part of the robot arm. Mounting the optical means at this location ensures that at least some of the arm targets and at least some of the base elements will always be visible, so that there are no blind spots.

The present invention, in further aspects, also provides methods for determining the position of a movable element or of the end of a robot arm, using such an apparatus.

The base targets preferably include retro-reflectors, and the base targets are preferably mounted on a support structure, preferably a support structure of low thermal expansivity. Similarly the arm targets preferably include retro-reflectors; and preferably the arm targets are mounted on a support structure attached to the wrist mechanism, preferably a support structure of low thermal expansivity. In each case the targets may comprise spherical retro-reflectors. Such retro-reflectors are suitable for use with a laser tracker.

It will be appreciated that a laser tracker can provide very accurate positional information, but does not take measurements of different positions very rapidly; the camera means can take observations of many different positions substantially in real-time and continuously, but must be calibrated to provide useful positional information. The camera means preferably comprises at least four cameras: two cameras arranged to provide stereoscopic images of at least some of the base targets, and two cameras arranged to provide stereoscopic images of at least some of the arm targets. Where the apparatus makes use of both a laser tracker and a camera means, the arm targets observed by the laser tracker may be different from the arm targets observed by the camera means, as long as the relative positions of all the arm targets are accurately known; and the same applies to the base targets.

The invention will now be further and more particularly described, by way of example only, and with reference to the accompanying drawings in which.

Figure 1:
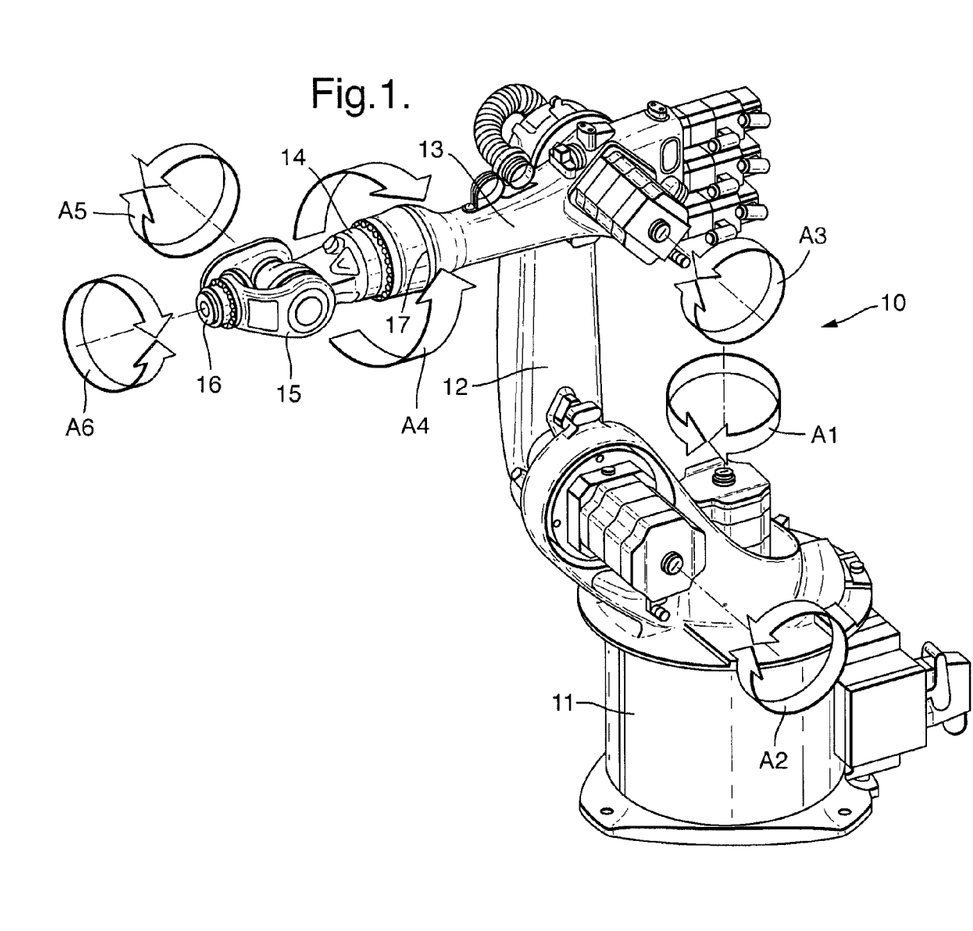
FIG. 1 shows a perspective view of a prior art robot, showing the degrees of freedom.

With reference to FIG. 1, the basic components of an articulating type of robot 10 that are relevant to this invention are a base 11, a first articulating arm 12, a second articulating arm 13, a rotatable arm end 14, and a wrist mechanism 15 which would typically carry a tool or probe (not shown) at its end 16. The first arm 12 can rotate about a vertical axis A1 and about a horizontal axis A2; the second arm can rotate about a horizontal axis A3 relative to the first arm 12; a joint 17 provides for rotation A4 of the arm end 14 about the longitudinal axis of the second arm 13; and the wrist mechanism 15 provides for rotations of the end 16 about two orthogonal axes A5 and A6. Such a robot 10 is known. In a workshop or cell one or more such robots may be installed.

Figure 2:
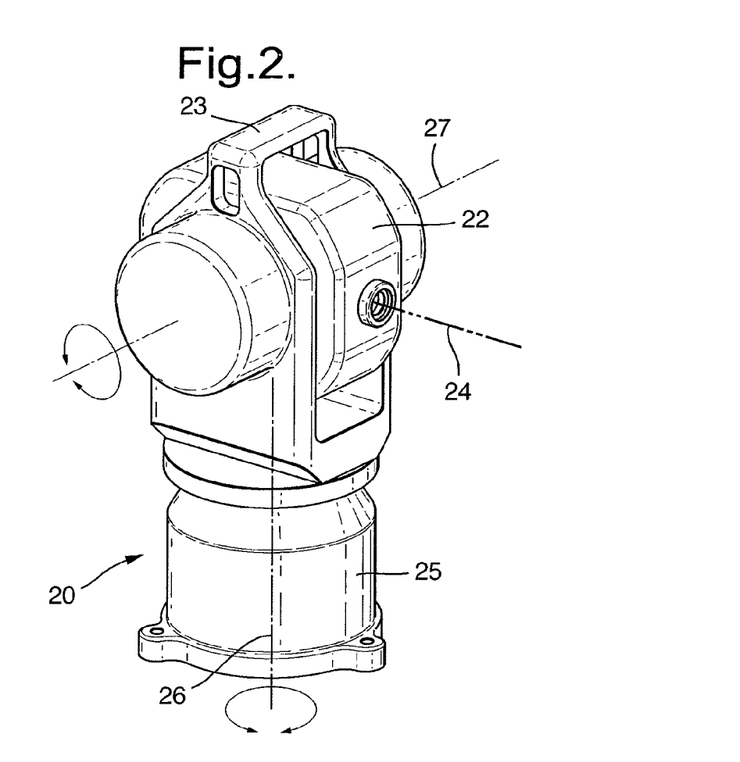
FIG. 2 shows a laser tracker.
Figure 3:
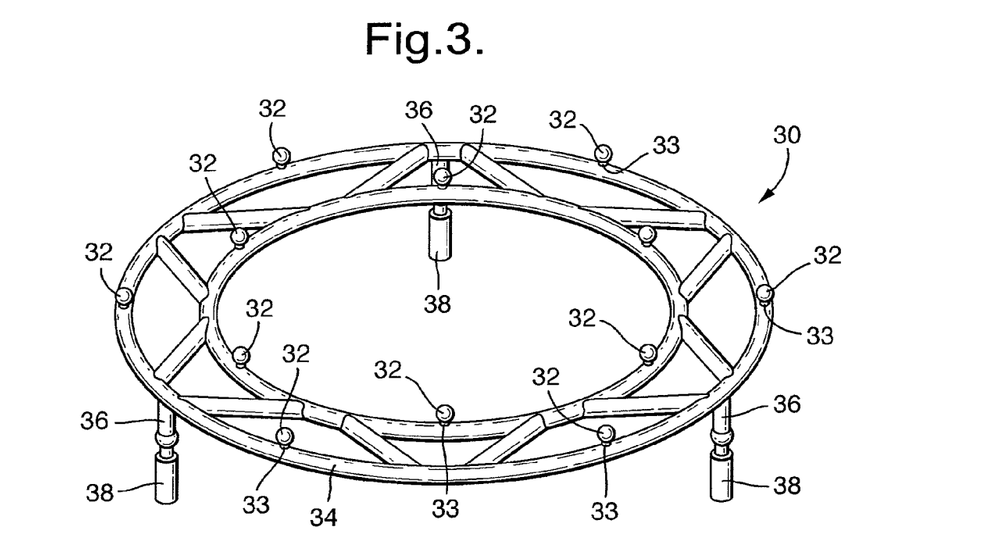
FIG. 3 shows a base ring of the invention, incorporating base targets.
Figure 4:
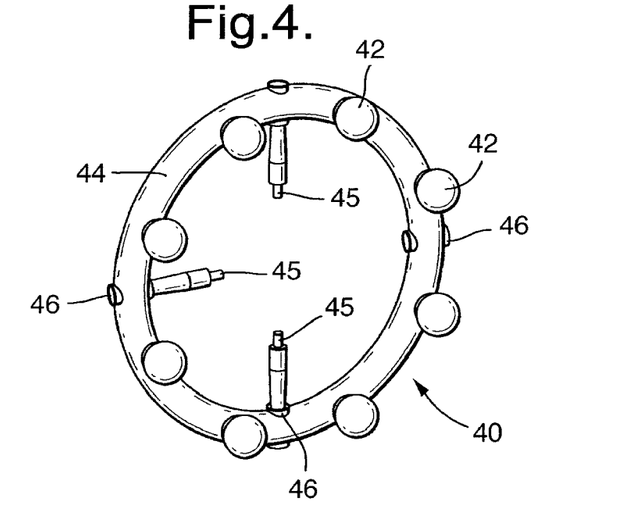
FIG. 4 shows an arm ring of the invention, incorporating arm targets.

FIGS. 2, 3 and 4, to which reference is now made, show components of an apparatus of the invention that enable a robot such as the one shown in FIG. 1 to achieve absolute accuracy. This apparatus 18 consists essentially of three items: a laser tracker 20 shown in FIG. 2; a base ring 30 shown in FIG. 3, complete with spherical retro-reflector targets 32; and an A4 axis arm ring 40 shown in FIG. 4, complete with spherical retro-reflector targets 42.

Referring now to FIG. 2, the laser tracker 20 incorporates a laser head 22 which emits a laser beam 24. The laser head 22 is supported in a frame 23 so that it can rotate about an elevation axis 27, while the frame 23 is supported on a base unit 25 so it can rotate about an azimuth axis 26. Hence the laser head 22 can be turned to send the laser beam 24 in any desired direction. The laser head 22 detects the reflected laser beam 24 if it is returned by a suitable target, and the distance between the head 22 and the centre of the target is measured very accurately using laser interferometry. Hence the laser tracker 20 enables the position of the target (relative to the laser tracker 20) to be determined accurately, effectively in a spherical coordinate system. The targets could have various shapes but as shown in FIGS. 3 and 4 one arrangement uses convex spherical targets 32 and 42.

Referring now to FIG. 3, the base ring 30 consists of a space frame 34, to which spherical retro-reflector targets 32 are attached. The space frame 34 is made of a material a very low coefficient of thermal expansion, for example NILO 36™ or INVAR™ steel materials, so the positional relationship between the targets 32 is unaffected by temperature variations, and its structure ensures rigidity. The base ring 30 is preferably mounted on the floor of the robot cell so as to surround the base 11 of the robot 10. The targets 32 may be fixed permanently to the space frame 34, but in this example the targets 32 are removable, locating in conical cups 33 to which the targets 32 are attracted magnetically. In this example the base ring 30 is supported by three downwardly-projecting legs 36 whose lower surfaces define conical recesses and which rest on ball-nosed support rods 38 which may be permanently fixed to the floor. Hence the base ring 30 can be removed, and the mounting points 36, 38 do not induce any mechanical stresses in the ring 30. In this embodiment, the base ring 30 is described as being attached to the cell floor but a ceiling or wall mounted ring and robot base could be an alternative arrangement. The base ring could even be attached to the robot base itself. In any event the method of attachment must fulfil the following two requirements:—

1. The surface to which the base ring 30 is attached must not move thermally or mechanically relative to the cell; and 2. The attachments do not induce mechanical stresses in the ring 30 that would deform it and change the positional relationship between the targets 32 attached to it.

The base ring 30 could be fixed or be detachable from its support rods 38. If it is detachable, the support rods 38 may be magnetic so that there is always a positive location between the legs 36 of the base ring 30 and the support rods 38.

Figure 5:
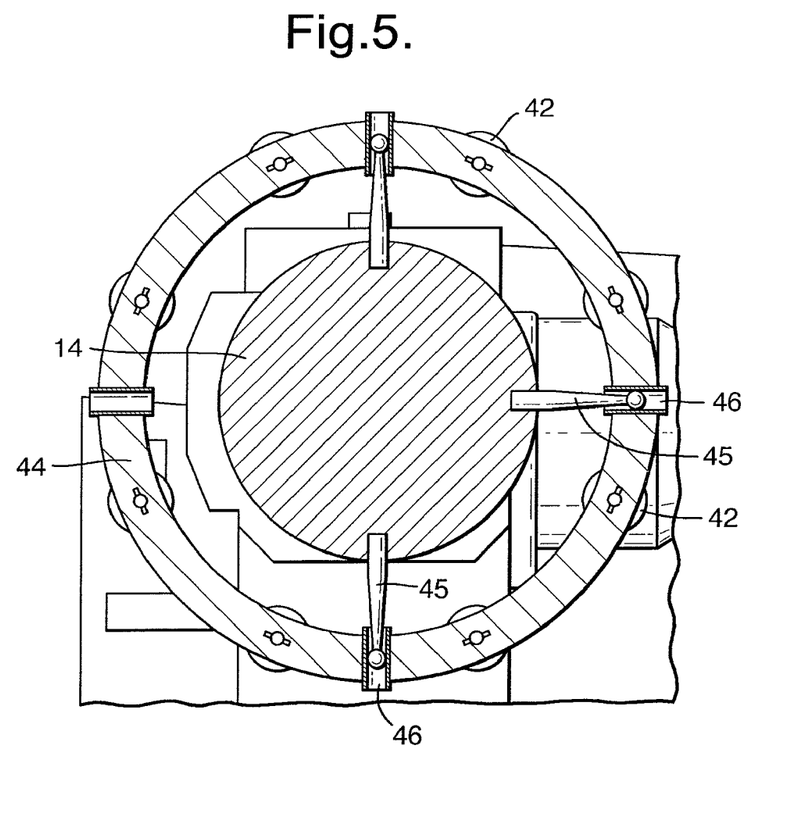
FIG. 5 shows a sectional view through an arm end on which is mounted the arm ring of FIG. 4.
Figure 6:
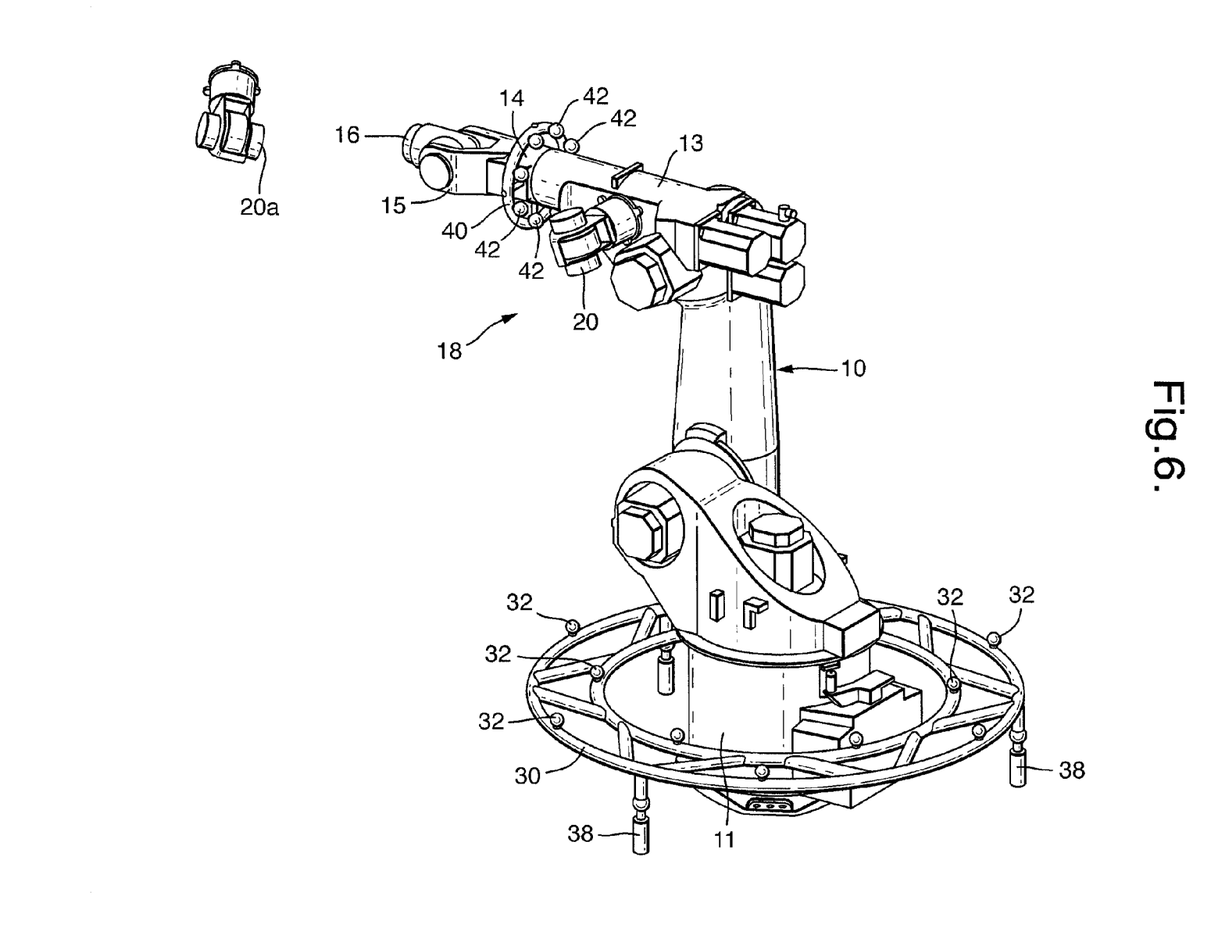
FIG. 6 shows a robot arm provided with an apparatus of the invention.

Referring now to FIGS. 4 to 6, the A4 axis arm ring 40 (see particularly FIG. 4) consists of a space frame 44 (which may be a hollow ring in this example), to which spherical retro-reflector targets 42 are attached. The space frame 44 is made of a material that has a very low coefficient of thermal expansion, such as NILO 36™ or INVAR™ steel, so the positional relationship between the targets 42 remains unaffected by temperature variations. As shown in FIG. 5, the A4 axis ring 40 surrounds the arm end 14 of the robot 10 and is attached to the arm end 14 in a way that does not induce any mechanical stresses in the A4 axis ring 40 that would deform it and change the positional relationship between the targets 42 attached to it. In this example the A4 axis ring 40 is attached to the arm end 14 using three ball nosed pins 45 with a threaded part at one end screwed into corresponding threaded recesses on the arm end 14. The outer end of each pin 45 locates in a radial tube 46 through the space frame 44, and the diameter of the pins 45 is slightly less than the diameter of the tubes 46. During installation the pins 45 are inserted through the tubes 46 and screwed into the body of the arm end 14. The ball ends of the pins 45 engage the wall of the tubes 46 with minimal or no clearance (as shown in FIG. 5).

In this example there are eight targets 42 attached around the space frame 44. As shown in FIG. 4 each target 42 locates in a conical cup 48 fixed to the space frame 44. The cups 48 are of magnetic material so that the targets 42 are held firmly and reliably in position, but can be removed if required.

The apparatus may be used in a cell in which there are one or more robots. To define absolute positional axes within the cell one would initially install targets (for example like the target retro-reflectors 32) at least three non-collinear positions on the floor of the cell, so defining an absolute X-Y plane; the Z-axis may be orthogonal to this plane; the origin may be at one of the targets (or at any desired position within the plane); the X- and Y-axes may be defined in any desired way within this plane, for example by compass directions. As shown in FIG. 6 a base ring 30 is installed around the base 11 of the (or each) robot 10. By means of a laser tracker 20 or an equivalent surveying device such as a laser theodolite the plane of the floor (the X-Y plane) can then be determined from the locations of the targets on the floor; and the exact location of each of the targets 32 on the base ring 30 can be determined relative to the XYZ axes. If there is more than one robot 10, there may be a base ring 30 permanently installed around the base of each robot 10, or alternatively there may just be three supports 38 installed around each robot 10, and a single base ring 30 may be transferred from around one robot 10 to around another. In any event the exact locations of the targets 32 at each base ring 30 location are determined in relation to the absolute co-ordinate system of the cell.

The laser tracker 20 is then mounted on the second articulating arm 13 of the robot 10. When the position of the robot arm is to be determined, the laser tracker 20 is programmed to look first at those targets 32 on the base ring 30 that are visible, and then at those targets 42 on the A4 axis ring 40 that are visible. Hence a connection is established between the position of the A4 axis arm ring 40 on the robot 10 and the respective base ring 30, whose position is already known in the absolute co-ordinate system.

It will be appreciated that in practice the computer control for the robot 10 knows where the robot arm should be, ignoring the sources of variation described earlier, so that the laser tracker 20 may be linked to the computer control, so that the laser tracker 20 does not have to search for the targets 32 and 42 at random, but rather can be directed to where they should be. In practice the laser tracker 20 requires only a brief search to find the exact direction to the centre of the target 32 or 42.

It will be appreciated that this procedure enables one to measure with the highest possible accuracy the absolute position of the A4 axis arm ring 40, which is effectively the base of the remaining components of the robot 10, that is to say the wrist mechanism 15 with its two rotation axes, at all times and under the actual working conditions. The position of the end 16 or that of the tool that is attached to the robot 10 is now to be determined. There are still the same problems of thermal expansion, but at a considerably reduced scale because the length of this wrist mechanism 15 is a small proportion of the total length of the robot 10. This is a much easier problem to solve than the original problem of the 6-axis robot. Because of its smaller size the thermal variations due to the environment temperature are much reduced, even without any compensation at all.

Secondly there are typically no motors in this part of the robot 10, so that heat effects due to the motors are non-existent; even in cases where there is a motor present the power is much less than other motors in the robot arm, and hence the heat dissipation is a much reduced problem. Finally, problems from lack of stiffness are substantially eliminated as the wrist mechanism 15 is very stiff, compared to the robot 10, as there are no long arms to flex, and only two joints; and in any event it is close to the load application point.

The position of the end 16 relative to the targets 42 on the A4 axis arm ring 40 can be determined with the robot 10 still in the cell but outside its actual working position or with the robot placed off-line. This may be achieved in various different ways depending on the accuracy required.

In a first approach, for example if the robot 10 is intended for measurement applications, the wrist mechanism 15 and the arm end 14 may be made of a material with a low thermal expansivity, such as NILO 36™ or INVAR™ steel, so thermal effects are negligible. During initial set up, the A4 axis is held fixed. The position of significant geometrical features of the end 16 (or of an item attached to it) are measured relative to the targets 42 on the A4 axis arm ring 40, for a number of positions of the wrist axes A5 and A6 (say every 10° for each axis). The measurement is made by a laser tracker 20 set up in a position from which it can view both the targets 42 and targets located on the end 16. Subsequently, for any intermediate positions of the wrist axes A5 and A6, the position of the end 16 can be obtained by interpolation between the values obtained during set-up, using the information from the angular position encoders associated with the wrist axes A5 and A6. The higher the resolution of these encoders the higher the accuracy with which the position of the end 16 can be determined. This method is particularly suited for measurement applications.

In a second procedure, if the 2-axis robot consisting of the arm end 14 and the wrist mechanism 15 cannot be made out of thermally stable material, the procedure described above could be repeated off-line in an environmental chamber with temperature varying from say 16° to 32° C. in steps of say 3 degrees. This method may be called temperature calibration. If necessary, such a calibration may also be carried out using a range of different loads.

In a third and preferred procedure, the position of the end 16 relative to the arm targets 42 could be found on-line during the robot cycle. For this, a second (external) laser tracker 20a is arranged in a fixed position in the cell (see FIG. 6). A number of retro-reflectors or photogrammetry targets are placed on significant positions on or around the end 16 (these positions may optionally be on an item carried by the robot 10, if the position of that item is to be determined). We will suppose that the robot 10 is initially at its working position; that it is carrying a load whose position is to be determined; and that the load is at least partly hidden in this working position. In a first step the positions of the visible targets 42 relative to the absolute frame of reference are determined as described above; and the exact positions of the A4, A5 and A6 axes are recorded (from the encoders or from the control system).

As a second step the robot 10 then moves the end 16 (with the same load or an identical load) so as to face the stationary laser tracker 20a; this may be in a calibration area adjacent to the working area. The orientations of the A4 axis and the wrist axes A5 and A6 are arranged to have the positions that they had had when at the working position. The stationary laser tracker 20a is installed to ensure that no matter how the axis A4 and the wrist axes A5 and A6 are articulated, the targets attached to the end 16 will always be visible.

This external laser tracker 20a is programmed to view the targets 32 on the base ring 30 (or other targets at known positions on the floor) and then the targets on the end 16. At the same time the laser tracker 20 on the arm 13 is programmed to view the targets 42 on the A4 axis arm ring 40 and the targets 32 on the base ring 30. Since both laser trackers 20 and 20a relate to the same absolute co-ordinate system, the positions of the targets attached to the end 16 are hence determined in the absolute frame of reference, and the positions of the targets 42 on the arm ring 40 are also determined in the absolute frame of reference; hence the relative positions between the targets attached to the end 16 and the targets 42 can readily be calculated for this particular configuration of the A4 axis and the two wrist axes A5 and A6. By combining these relative positions with the absolute positions of the targets 42 found in the first step, the absolute positions of the targets attached to the end 16 when the robot 10 had been in its working position can be readily calculated.

After this "in-cell, but off-working position" calibration is completed, the robot can continue to its working position and perform the task required. Although this procedure has been described in relation to targets attached to the end 16, it would be equally applicable to targets attached to any significant positions on the load.

This procedure may be repeated at a number of environmental temperatures, so that the said relative positions are calibrated for those temperatures, and in this case the second laser tracker 20a would not be required afterwards. Alternatively the procedure may be performed on every occasion on which the exact position of the end 16 (or of an item supported by it) is to be ascertained.

It will be appreciated that the above description is provided by way of example only, and that the apparatus and method of the invention may be modified in various ways. For example in a working environment or cell in which there are several different robots operating, a dedicated laser tracker 20 may be installed (as described above) on each robot 10. As an alternative a single such laser tracker 20 may be provided, this being cycled between different robots 10. In this way, the cost of the laser tracker 20 is shared between different robots, so its cost is not the determining factor in an installation. Once the absolute positioning of one robot is determined, the laser tracker 20 may be passed automatically from one robot to another. Depending on the number of robots in the cell, the cycle time could be something around an hour. The conditions (and associated positional variations due to thermal effects) are usually not expected to change much within an hour. This data gathering cycle in a robotic cell could be extended to a week for example and then the laser tracker could be passed manually or automatically to another cell.

It should be understood that the absolute positioning apparatus 18 of the present invention could be designed as an integral feature of a new robot design, or retrofitted to existing, articulating type of robots. It determines the absolute position of all robots within a robotic cell under their actual working conditions and over their entire envelope by measurement—mathematical modelling to estimate the absolute position of the robot is not required. The apparatus 18 determines the absolute position of the robot without any degradation of its performance (payload capacity, envelope range, speed and accuracy). It enables this to be achieved and set up for all robots in a cell, so that all the robots are related to the same absolute frame of reference in the cell.

In further alternatives the targets—whether retro-reflectors or photogrammetry targets—could be attached directly to the A4 axis arm (the arm end 14) or the base 11 of the robot 10, without any ring or framework, and indeed the base targets could be mounted on the same surface (for example the floor) as the robot base itself. For some applications this may provide an acceptably accurate system. Nevertheless benefits arise from the use of a space frame 34 around the base 11 made of thermally stable material, ensuring that the targets 32 remain in fixed positions with respect to the cell, so as to provide an absolute local reference system for each robot. The provision of the space frame 44 supporting the arm targets 42 is of less significance to overall accuracy, as the exact position of these targets 42 is measured by the laser tracker 20 relative to the targets 32 on the base ring 30.

It will also be appreciated that the arm targets and the base targets may comprise different types of retro-reflector, for example a spherically mounted retro-reflector comprising a retro-reflector (a cube corner made of three mutually orthogonal mirrors) housed inside a hollow sphere. Alternative types of target would be a spherical retro-reflector commercially known as a "cat's eye", that is made out of two hemispheres having different diameters and optical properties; or a hard mounted hollow retro-reflector such as those manufactured by PLX Inc (in the USA). Whatever type of target is used, the targets are mounted in such a way that their relative positions can readily be measured with conventional measuring equipment.

The procedure described above enables the position of the robot arm 10 to be accurately measured along a trajectory that it follows during operation. However laser trackers 20 are slow at taking measurements: the robot arm 10 may have to stop for several seconds at each different position, so that the laser tracker 20 can take its measurements. The laser tracker 20 is also a comparatively expensive item. Hence it may be preferable to use the laser tracker 20 during a calibration stage, and subsequently to use cameras, such as high-speed photogrammetry cameras, to measure the arm position during normal operation, the cameras having been suitably calibrated. It will be appreciated that cameras can view several items substantially simultaneously; and that stereoscopic information may be obtained by using a pair of cameras.

Figure 7:
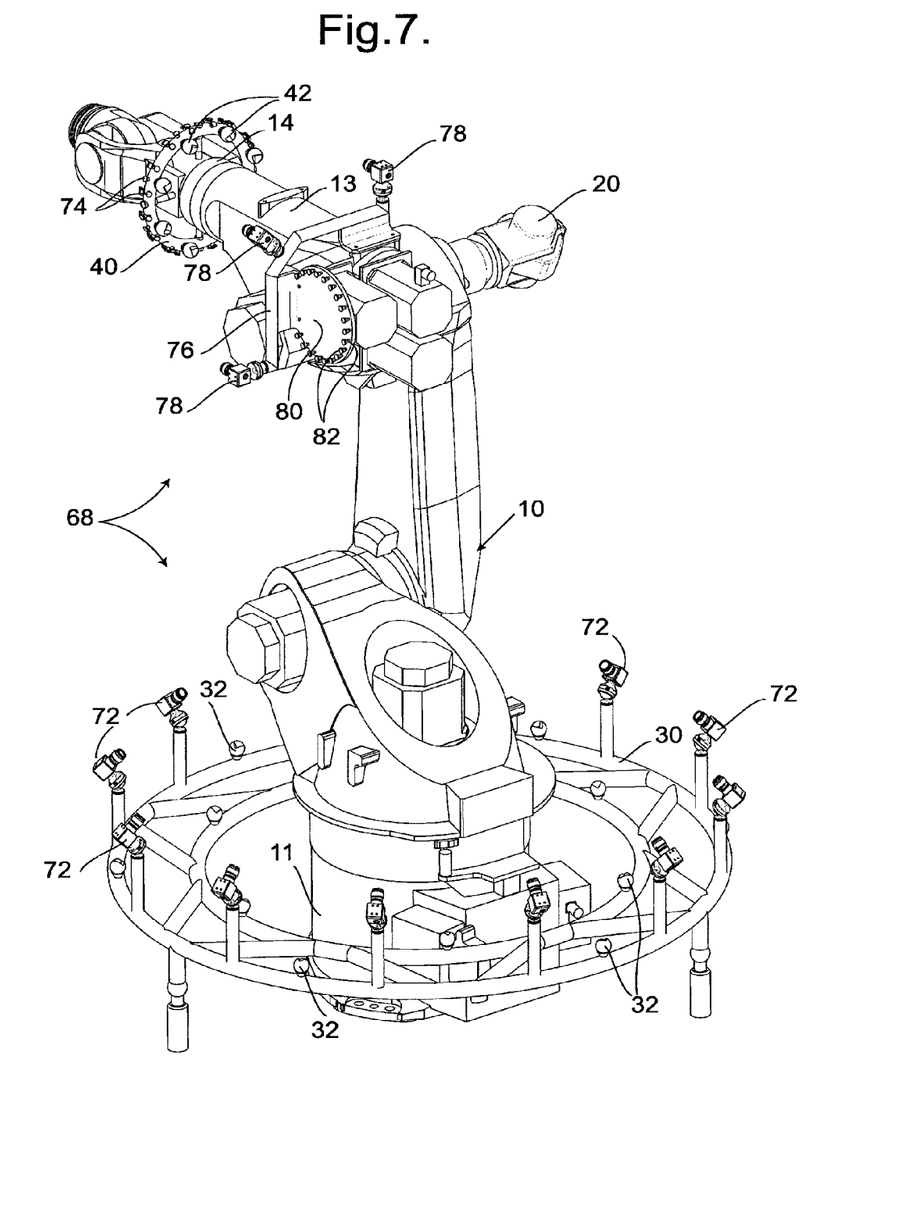
FIG. 7 shows a modification to the robot arm of FIG. 6.

Referring now to FIG. 7, this shows a modification 68 to the absolute positioning apparatus 18 shown in FIG. 6, components that are the same being referred to by the same reference numeral. As in FIG. 6 a base ring 30 is mounted so as to surround the base 11 of the robot 10, and an A4 axis arm ring 40 surrounds and is attached to the arm end 14 of the robot 10;

the base ring 30 and the arm ring 40 each carries several spherical retro-reflector targets 32 or 42. In this apparatus 68 the base ring 30 also carries several photogrammetry cameras 72 in fixed positions around it, while the arm ring 40 also carries several photogrammetry targets 74 each consisting of a pin with a circular flat-topped head with an accurately cylindrical periphery, all fixed to the arm ring 40 at known positions. The relative positions of the targets 32 and the cameras 72 on the base ring 30 can be measured with conventional measuring equipment.

As in FIG. 6 a laser tracker 20 may be mounted on the second articulating arm 13 of the robot 10. In addition a generally L-shaped optical frame 76 is fixed rigidly to the second articulating arm 13, this frame carrying three photogrammetry cameras 78 (one at each end of the L-shape and one next to the corner). The optical frame 76 also includes a rigid circular plate 80 carrying a circumferential ring of photogrammetry targets 82 (identical to the targets 74). The optical frame 76 is made of a material that has a very low coefficient of thermal expansion, such as NILO 36™ or INVAR™ steel, so the positional relationship between the cameras 78 and the targets 82 remains unaffected by temperature variations.

Figure 8:
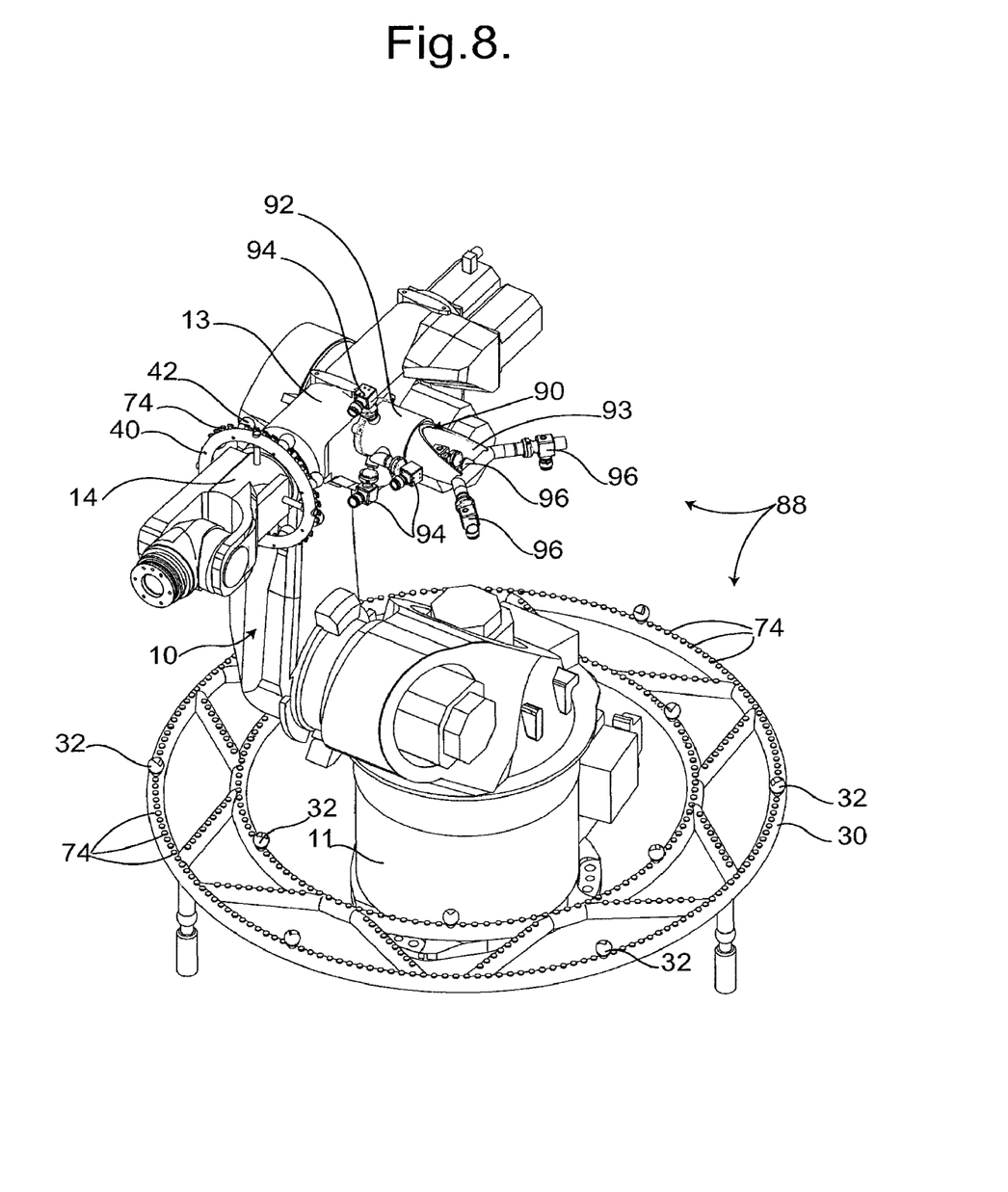
FIG. 8 shows another modification to the robot arm of FIG. 6.

Referring now to FIG. 8, this shows a modified apparatus 88 that is an alternative to the apparatus 18 of FIG. 6 and the apparatus 68 of FIG. 7, components that are the same being referred to by the same reference numeral. As in FIGS. 6 and 7 a base ring 30 is mounted to surround the base 11 of the robot 10, and an A4 axis arm ring 40 surrounds and is attached to the arm end 14 of the robot 10. The base ring 30 and the arm ring 40 each carries several spherical retro-reflector targets 32 or 42; in this apparatus 88 they also each carry a multiplicity of circular photogrammetry targets 74. The relative positions of the targets 32 and the targets 74 on the base ring 30, and the relative positions of the targets 42 and the targets 74 on the arm ring 40, can each be measured using conventional equipment, and do not vary.

A laser tracker 20 may be mounted on the second articulating arm 13 of the robot 10, although this is not used during normal operation, and is not shown. A photogrammetry camera unit 90 is mounted on the second articulating arm 13. The photogrammetry camera unit 90 consists of a cylindrical base unit 92, and a yoke 93 fixed to the base unit 92 and rotatable about its longitudinal axis. The base unit 92 carries three photogrammetry cameras 94 arranged at the corners of a triangle to view the photogrammetry targets 74 on the A4 axis arm ring 40, and similarly the yoke 93 carries three photogrammetry cameras 96 arranged at the corners of a triangle to view the photogrammetry targets 74 on the base ring 30. The cameras 94 are locked in appropriate orientations relative to the base unit 92, while the cameras 96 are locked in appropriate orientations relative to the yoke 93. The base unit 92 includes a motor to rotate the yoke 93, and an angular encoder to measure that rotation; in use the motor may be used to rotate the yoke 93 in accordance with movements of the robot 10 to ensure that the cameras 96 can view the base ring 30.

It will be appreciated that the high-speed photogrammetry cameras 94 and 96 can be calibrated as a module, using conventional techniques such as direct calibration or a Tsais calibration algorithm, as the cameras 94 and 96 provide (in each case) three stereo pairs. For example the cameras 94 and the cameras 96 may be calibrated using a standard calibration plate with an accurately engraved pattern of geometrical shapes whose relative positions are accurately known, and to which are attached least three retro-reflectors. During the calibration process the plate is placed at various positions within the field of view of the cameras 94 (to enable them to be calibrated), and then at positions in the field of view of the cameras 96, and in each case the spatial position of the plate is determined by a separately mounted stationary laser tracker 20a to determine the positions of the retro-reflectors, and hence of the engraved pattern, in the calibration frame of reference. The calibration frame of reference is the same for all the cameras 94 and 96 of the camera unit 90. The calibration of the cameras 96 is carried out at many different orientations of the yoke 93 relative to the base unit 92 (as determined by the angular encoder), for example at equally spaced orientations differing by an angle between 1° and 10°. In subsequent operation, the images of the targets 74 on the base ring 30 as viewed by the cameras 96 enable the calibration frame of reference to be related to the absolute frame of reference.

As an alternative to the offline calibration described above, the cameras 94 and 96 may be calibrated when installed on the robot 10, prior to use. In this case the robot 10 is moved from one point to another along a desired working trajectory, and the positions of the targets 42 are determined relative to the base ring 30 by a movable laser tracker 20, as described earlier. The positions of the photogrammetry targets 74 on the arm ring 40 are consequently known in the absolute frame of reference. At each robot position the cameras 96 on the yoke 93 may be calibrated from the images of the targets 74 on the base ring 30. Similarly the coordinates of the targets 74 on the arm ring 40 enable the cameras 94 on the base unit 92 to be calibrated. The robot 10 is moved to another position, the yoke 93 is readjusted if necessary, and the process is repeated. In this case the calibration coordinate system is the absolute coordinate system. This calibration procedure has the advantage that the same targets 74 are used both in calibration and in normal operation. In use, the appropriate calibration can be deduced by interpolation between positions at which calibration had been performed.

It will be appreciated that a calibration procedure as described above in relation to the apparatus 88 would be applicable mutatis mutandis to the apparatus 68, to calibrate the cameras 72 and the cameras 78. The photogrammetry targets 82 on the circular plate 80 are used in this case to calibrate the cameras 72 on the base ring 30. The absolute position of the targets 82 is determined by a stationary laser tracker 20a that locates in turn the targets 32 placed on the base ring 30, and then at least three retro-reflector targets (not shown) placed on the optical frame 76 or circular plate 80. The positions of these retro-reflector targets relative to the photogrammetry targets 82 are known by the way the optical frame 76 is constructed.

In normal operation the laser tracker 20 on the robot 10 is not required, as the cameras 94 and 96 enable the positions of the A4 axis arm ring 40 to be determined in an absolute frame of reference. It will be appreciated that if, for example, the calibration of the cameras 96 has been carried out at orientations of the yoke 93 every 5° during rotation, then the images from the cameras 96 may be acquired whenever the orientation of the yoke 93 (as monitored by the encoder) passes through such a value. Alternatively measurements may be taken from the images at any orientation, using data from the encoder to interpolate between the orientations at which calibration was carried out. The cameras 94 and 96 hence enable the position of the A4 axis arm ring 40 to be determined substantially continuously and in real-time as the robot 10 moves. If it is necessary to check the information so obtained, or if very accurate positional information is necessary especially while the robot 10 is not moving, then the laser tracker 20 may be used as described in relation to the apparatus 18 to determine the position of the A4 axis arm ring 40.

It will be appreciated that the apparatuses 18, 68 and 88 are shown by way of example only, and that they may be modified in different ways while remaining within the scope of the present invention. In particular the wrist mechanism might in each case be replaced by small and lightweight autonomous robot arm, the autonomous robot arm being rigidly connected to the rotational support element. Indeed the rotational support element may form part of the autonomous robot arm. The main robot 10 enables the autonomous robot arm to be moved throughout a large space, and to be held at any desired position. At any such position the autonomous robot arm can then operate independently of the main robot 10; and at any desired position the exact position of the base of the autonomous robot arm can be accurately measured in the absolute frame of reference using either the laser tracker 20, as in FIG. 6, or a camera system, such as that described in relation to FIG. 8.

As mentioned previously, the calibration to determine the position of the end 16 (for example of a tool or a sensor) relative to the targets 42 on the A4 axis arm ring 40 may utilise an external laser tracker 20a. Alternatively this calibration may also utilise a camera system (equivalent to the cameras 94), suitably calibrated with respect to the absolute frame of reference, and mounted externally to enable the end 16 to be viewed. For example such a calibration camera arrangement may be arranged at a fixed position within the cell, so that at intervals the end 16 can be brought adjacent to this position, to check if the tool or end effector has moved or deformed.

In a further modification, a camera system consisting of at least one stereo pair (e.g. equivalent to the cameras 94) may be mounted on the end 16 of the robot arm, and is calibrated with respect to a frame of reference based on the position of the arm ring 40. This calibration would be carried out for a multiplicity of different orientations of the end effector (i.e. of the various rotation axes/articulations between the arm ring 40 and the end 16). This then provides the facility for a non-contact measurement robot, as this camera system can be moved by the robot to view an item, and the exact location of that item can be then readily determined in the absolute frame of reference, using the calibration data and the encoder positions at each articulation of the end effector.

The invention claimed is:

1. An apparatus for determining the position of the end of a robot arm that is movable within a frame of reference, the robot arm having several degrees of freedom, the robot arm being mounted on a base and including a wrist mechanism, the wrist mechanism including a rotational support element, the apparatus comprising a multiplicity of first targets fixed relative to the wrist mechanism of the robot arm, and a multiplicity of base elements at fixed positions relative to the frame of reference, the apparatus also comprising an optical measurement system including optical means movable with the robot arm, wherein the base elements are around the base of the robot, and the first targets are arranged as arm targets around the rotational support element of the wrist mechanism, and the movable optical means is mounted on or adjacent to the robot arm, and the optical measurement system comprising means to enable the positions of at least some of the base elements relative to the movable optical means and the positions of at least some of the arm targets relative to the movable optical means to be determined.

2. An apparatus as claimed in claim 1 wherein the movable optical means comprises a laser tracker.

3. An apparatus as claimed in claim 1 wherein the base elements are base targets.

4. An apparatus as claimed in claim 3 wherein the base elements comprise retro-reflectors.

5. An apparatus as claimed in claim 1 wherein the base elements comprise base cameras, and the movable optical means comprises at least one target and at least one camera to view the arm targets.

6. An apparatus as claimed in claim 1 wherein the base elements are mounted on a base element support structure of a material of low thermal expansivity.

7. An apparatus as claimed in claim 6 wherein the base element support structure is arranged to rest on three spaced-apart support elements.

8. An apparatus as claimed in claim 6 wherein the base elements are readily removable from and replaceable on the base element support structure.

9. An apparatus as claimed in claim 1 wherein the first targets comprise retro-reflectors.

10. An apparatus as claimed in claim 1 wherein the first targets are mounted on an arm target support structure of a material of low thermal expansivity surrounding and mounted to the wrist mechanism.

11. An apparatus as claimed in claim 1 wherein the movable optical means is mounted on an arm element to which the rotational support element of the wrist mechanism is attached.

12. A method for determining the position of the end of a robot arm, comprising using an apparatus as claimed in claim 1.

13. A method for repeatedly determining the positions of the ends of a plurality of robot arms as claimed in claim 12 in which the arm targets or the base elements or the movable optical means are exchanged between different robot arms cyclically.

* * * * *

UNITED STATES PATENT AND TRADEMARK OFFICE
CERTIFICATE OF CORRECTION

PATENT NO. : 8,290,618 B2
APPLICATION NO. : 12/528742
DATED : October 16, 2012
INVENTOR(S) : Andreas Haralambos Demopoulos It is certified that error appears in the above-identified patent and that said Letters Patent is hereby corrected as shown below:

The title page of the patent contains an error involving the incorrect spelling of the assignee's name.

Item [73] Assignee reads:
"CNOS Automations Software GmbH"

Item [73] Assignee should read:
--inos Automationssoftware GmbH--

Signed and Sealed this
Twenty-ninth Day of October, 2013

Teresa Stanek Rea
*Deputy Director of the United States Patent and Trademark Office*